D. M. KIRKBRIDE & M. NEIL.
Plashed Fence.

No. 208,742.  Patented Oct. 8, 1878.

UNITED STATES PATENT OFFICE.

DAVID M. KIRKBRIDE AND MICHAEL NEIL, OF DAYTON, OHIO.

IMPROVEMENT IN PLASHED FENCES.

Specification forming part of Letters Patent No. 208,742, dated October 8, 1878; application filed September 20, 1878.

*To all whom it may concern:*

Be it known that we, DAVID M. KIRKBRIDE, of Dayton, in the county Montgomery and State of Ohio, and MICHAEL NEIL, of same place, have invented a certain new and useful Improvement in Plashed Fences; and we do hereby declare the following to be a full and exact description of the same, reference being had to the accompanying drawings, forming part of this specification, in which—

Figure 1:
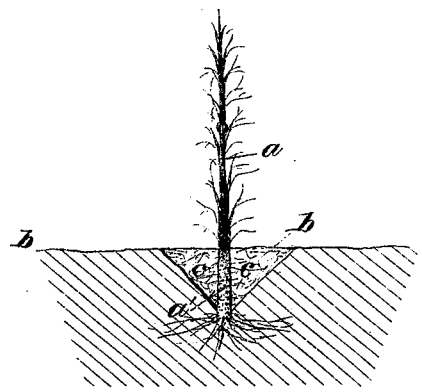
Figure 2:
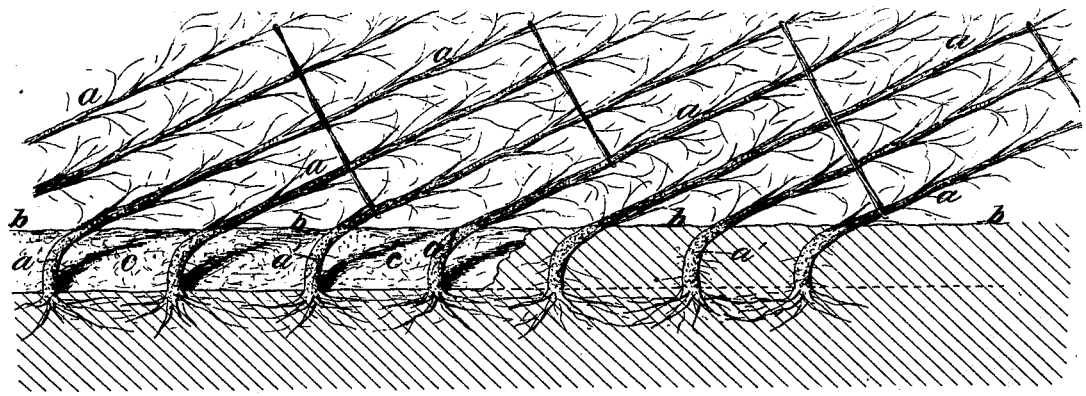

Figure 1 is a vertical cross-section, and Fig. 2 is a vertical longitudinal section.

Similar letters of reference in the several figures denote the same parts.

This invention is an improvement upon the inventions patented, respectively, by D. M. Kirkbride, May 30, 1876, No. 178,161, and Wesley Young, December 19, 1876, No. 185,616; but the principle of our present improvement may also be applied to all plashed fences in which the growing twigs are bent down to form the hedge or fence.

In plashing hedges by the methods in use before our present improvement, the twigs were bent above the surface of the ground, the bending being effected with or without cutting the side of the twig.

In plashing the osage-orange and other woods possessing similar qualities the cutting of the side of the twig injures it, and the bending of the twig above and near the ground is also liable to crack, rupture, or otherwise injure it at and near the point of flexure, the wood oftentimes being too stiff to bend without injury. In order to obviate this difficulty, we have discovered and adopted the new mode, which consists in removing the earth from around the sides of the twig or cane above the lower roots, and then bending the twig in such a manner that the point of flexure shall come within that part of the plant which had been covered by the removed soil, where the twig is soft and flexible, and after bending at that point and plashing down replacing the earth around the plants.

In the drawings, $a\ a$ represent the twigs, and $b\ b$ the horizontal line or level of the surface of the ground.

Prior to plashing we excavate the soil from around the sides of the plants, as shown at $c$, to such a depth as not to injure the plant, but to expose a portion, $a'$, of the stem or trunk that had before been covered by the soil. We then bend the plants or canes down by a flexure at the part $a'$, which can be done without injury, as that part is more flexible than any other part of the twig. Having plashed the hedge, we fill in the opening $c$ with earth, and pack it down, so that it will firmly hold the hedge. The bend of the twigs being below the surface of the ground and the dirt being well packed around them, they maintain their position better than when bent above ground, and the whole operation is more easily and safely conducted than by the old modes.

In cases of large or strongly-grown hedges, it may sometimes be preferable to sever some of the lateral or "brace" roots after or at the time of excavating the dirt around the canes.

When the surface dirt is light and easily moved or softened by moisture or otherwise, so as not to impede the bending below the surface, the canes may, with care, be bent beneath the surface without removing the dirt from around them, and this plan, though not recommended for practical use, will be a mere equivalent of our mode of operation. So, too, the same result can be attained by stirring up and loosening the dirt around the lower end of the plants without removing it, or with only a partial removal of it.

Having thus described our invention, we claim as new—

The mode of plashing hedges herein described, consisting, essentially, in bending the twigs or canes below the surface of the ground and fastening them in position in line of the hedge, as herein set forth.

DAVID M. KIRKBRIDE.
MICHAEL NEIL.

Witnesses:
GEO. R. YOUNG,
DANL. K. BOYER.